(12) United States Patent
Schenk et al.

(10) Patent No.: US 7,716,937 B2
(45) Date of Patent: May 18, 2010

(54) ELECTRONIC REFRIGERATION CONTROL SYSTEM INCLUDING A VARIABLE SPEED COMPRESSOR

(75) Inventors: Dennis Schenk, Anderson, SC (US); Karl M. Truitt, Richmond, IN (US)

(73) Assignee: Electrolux Home Products, Inc., Cleveland, OH (US)

( * ) Notice: Subject to any disclaimer, the term of this patent is extended or adjusted under 35 U.S.C. 154(b) by 794 days.

(21) Appl. No.: 11/378,081

(22) Filed: Mar. 17, 2006

(65) Prior Publication Data

US 2007/0012055 A1 Jan. 18, 2007

Related U.S. Application Data

(60) Provisional application No. 60/662,678, filed on Mar. 17, 2005, provisional application No. 60/662,694, filed on Mar. 17, 2005.

(51) Int. Cl.
F25B 1/00 (2006.01)
(52) U.S. Cl. ............... 62/228.4; 62/155; 62/234
(58) Field of Classification Search ........... 62/228.3, 62/431, 432, 438, 442, 455, 155, 234
See application file for complete search history.

(56) References Cited

U.S. PATENT DOCUMENTS

| | | | |
|---|---|---|---|
| 3,299,650 A | 1/1967 | Hollingworth | |
| 3,729,952 A | 5/1973 | Macleod | |
| 3,735,602 A | 5/1973 | Ramsey | |
| 3,817,451 A | 6/1974 | Ramsey | |
| 4,646,534 A | 3/1987 | Russell | |
| 4,662,185 A | 5/1987 | Kobayashi et al. | |
| 4,718,247 A | 1/1988 | Kobayashi et al. | |
| 4,843,833 A | 7/1989 | Polkinghorne | |
| 5,255,530 A | 10/1993 | Janke | |
| 5,261,247 A | 11/1993 | Knezic et al. | |
| 5,282,723 A | 2/1994 | Bellomo | |
| 5,460,009 A | 10/1995 | Wills et al. | |
| 5,548,969 A | 8/1996 | Lee | |
| 5,711,159 A | 1/1998 | Whipple, III | |
| 6,101,826 A * | 8/2000 | Bessler | 62/187 |
| 6,112,535 A | 9/2000 | Hollenbeck | |
| 6,161,394 A | 12/2000 | Alsenz | |
| 6,216,478 B1 | 4/2001 | Kang | |
| 6,523,361 B2 | 2/2003 | Higashiyama | |
| 6,530,236 B2 | 3/2003 | Crane et al. | |
| 6,622,503 B1 * | 9/2003 | Bennett et al. | 62/186 |
| 6,675,590 B2 | 1/2004 | Aarestrup | |
| 6,684,656 B2 * | 2/2004 | Gray et al. | 62/229 |
| 6,691,524 B2 | 2/2004 | Brooke | |
| 6,701,739 B2 | 3/2004 | Morse | |
| 6,739,146 B1 * | 5/2004 | Davis et al. | 62/155 |
| 6,769,265 B1 | 8/2004 | Davis et al. | |
| 6,772,601 B1 | 8/2004 | Davis et al. | |
| 6,779,353 B2 | 8/2004 | Hu et al. | |
| 6,782,706 B2 | 8/2004 | Holmes et al. | |
| 6,817,195 B2 | 11/2004 | Rafalovich et al. | |

(Continued)

*Primary Examiner*—Ljiljana (Lil) V Ciric
(74) *Attorney, Agent, or Firm*—Pearne & Gordon LLP

(57) ABSTRACT

A refrigerator has a refrigeration system including a variable speed compressor, a condenser, a condenser fan, an evaporator, a variable speed evaporator fan. The refrigerator further includes multiple temperature sensors that communicate with an electronic microprocessor-based control system that in turn controls the operation of the refrigerator system based on the information provided by the multiple temperature sensors.

5 Claims, 9 Drawing Sheets

U.S. PATENT DOCUMENTS 6,959,559 B2 * 11/2005 Nam et al. .................... 62/187
2003/0182957 A1 * 10/2003 Hu et al. .................... 62/228.4
2005/0011205 A1     1/2005 Holmes et al.

* cited by examiner

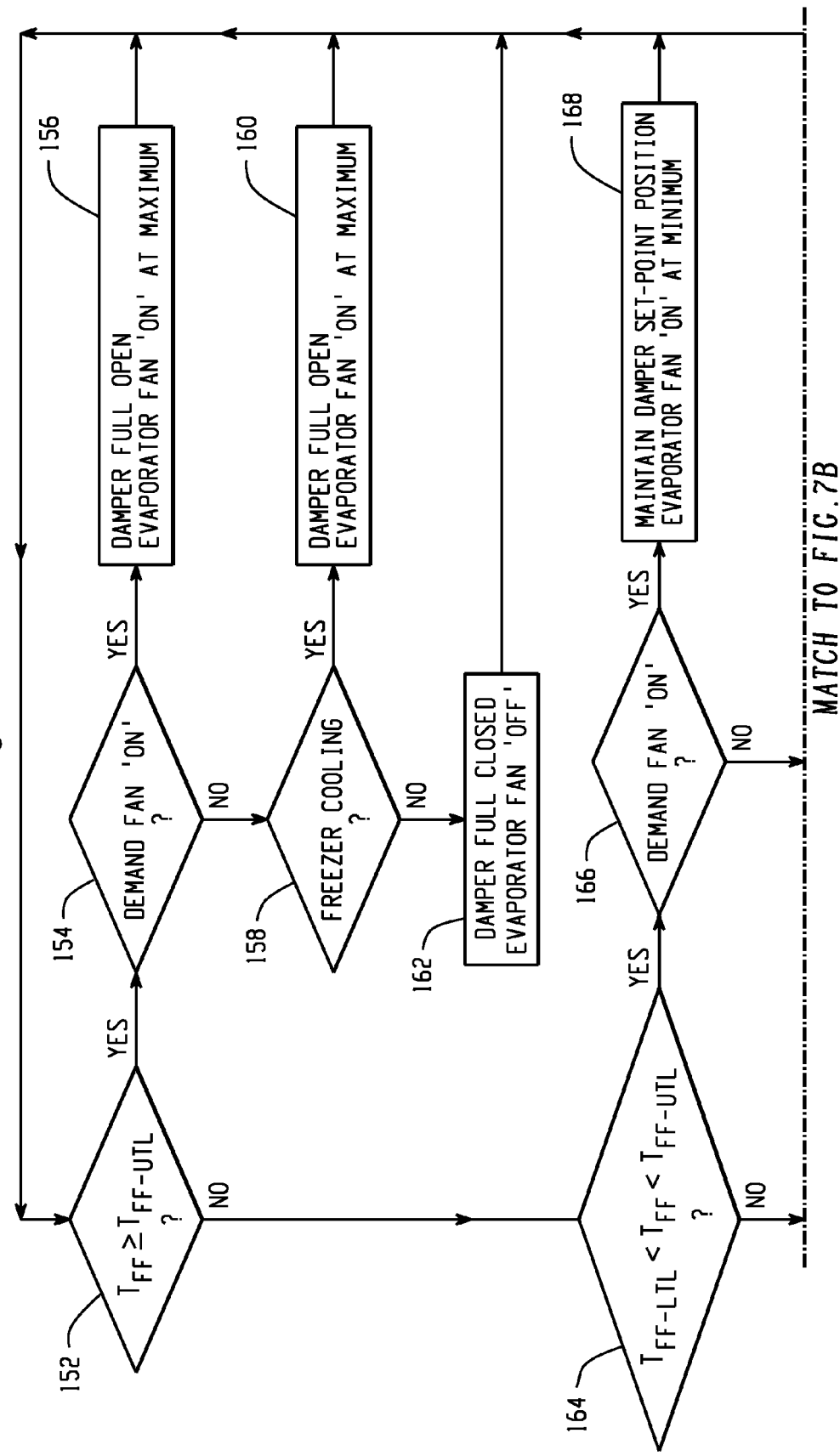

US 7,716,937 B2

ELECTRONIC REFRIGERATION CONTROL SYSTEM INCLUDING A VARIABLE SPEED COMPRESSOR

This application claims the benefit of U.S. Provisional Patent Application Nos. 60/662,678 and 60/662,694 both of which were filed on Mar. 17, 2005.

FIELD OF THE INVENTION

The present invention relates to a refrigeration appliance having a freezer compartment and a fresh-food compartment and more specifically to a refrigerator having a variable speed compressor and an electronic refrigeration control system for controlling the variable speed compressor.

BACKGROUND OF THE INVENTION

A typical refrigerator includes a freezer compartment that operates at a temperature below freezing and a fresh-food compartment that operates at a temperature between ambient and freezing. Typically, a damper or baffle is provided to control air flow between the freezer compartment and the fresh-food compartment. Conventional refrigerators include a refrigeration system having refrigeration components comprising a compressor, a condenser coil, a condenser fan, an evaporator, an evaporator fan and multiple single speed fans to direct the cool air throughout the freezer and fresh-food compartments. In addition, temperature sensors are provided inside the refrigerator to measure the temperature inside the freezer and fresh-food compartments. Conventional refrigerators also include an electronic control system to control non-refrigeration components, such as a user interface, lights, alarms, etc. but use conventional and less efficient timer-based methods to control the refrigeration components, such as the compressor, condenser, evaporator, etc. Thus, what is required is an electronic control system that controls all the components of the refrigerator including the refrigeration components to maximize efficiency.

In conventional refrigerators the refrigeration components operated at a single speed. Thus, when cooling was required, such as when a compartment door was opened, these systems were forced to operate a maximum level to cool the compartment down to its predetermined temperature. These single speed systems proved to be inefficient. In order to improve the efficiency of the refrigeration system variable speed systems having variable speed components were implemented where the speed of one or more of the refrigeration components is varied depending on the variation in temperature. These systems use several factors to vary the speed of the components, such as temperature of the freezer and fresh-food compartments, the ambient temperature, upper and lower temperature limits, etc. None of these systems, however, utilize all the factors to optimize the efficiency of the refrigerator system. Thus, what is required is a refrigerator system that utilizes multiple variables to vary the speed of the variable speed components to achieve optimum efficiency.

The present invention relates to a controller for achieving optimum efficiency by controlling various aspects of the refrigeration system. Similar refrigerators of this type are shown and described in the following U.S. Patents, which are incorporated herein by reference: U.S. Pat. No. 5,201,888 to Beach, Jr. et al., U.S. Pat. Nos. 6,523,358, 6,694,755, and 6,837,060 to Collins, and U.S. Pat. No. 6,497,108 to Collins et al.

BRIEF SUMMARY OF THE INVENTION

In accordance with one aspect, a refrigerator is provided comprising a first compartment, a second compartment, a refrigeration system including a variable speed compressor for cooling the first and second compartments and an electronic control system for controlling a speed of the variable speed compressor, wherein the electronic control system controls the speed of the variable speed compressor according to a calculated speed that is a function of a first compartment set-point temperature, a second compartment set-point temperature and an ambient temperature.

In accordance with another aspect, a method of controlling a refrigeration system in a refrigerator is provided comprising the steps of measuring a freezer compartment temperature, comparing the freezer compartment temperature with a freezer compartment upper temperature limit and a freezer compartment lower temperature limit, operating at least one of a variable speed compressor, a condenser, and an evaporator fan based on the comparison of the measured freezer compartment temperature, a freezer compartment set-point temperature, a fresh-food compartment set-point temperature and an ambient temperature.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

FIGS. 7A and 7B are a flowchart illustrating the operation of the refrigerator system as controlled by the fresh-food compartment temperature.

DETAILED DESCRIPTION OF THE INVENTION

Figure 1:
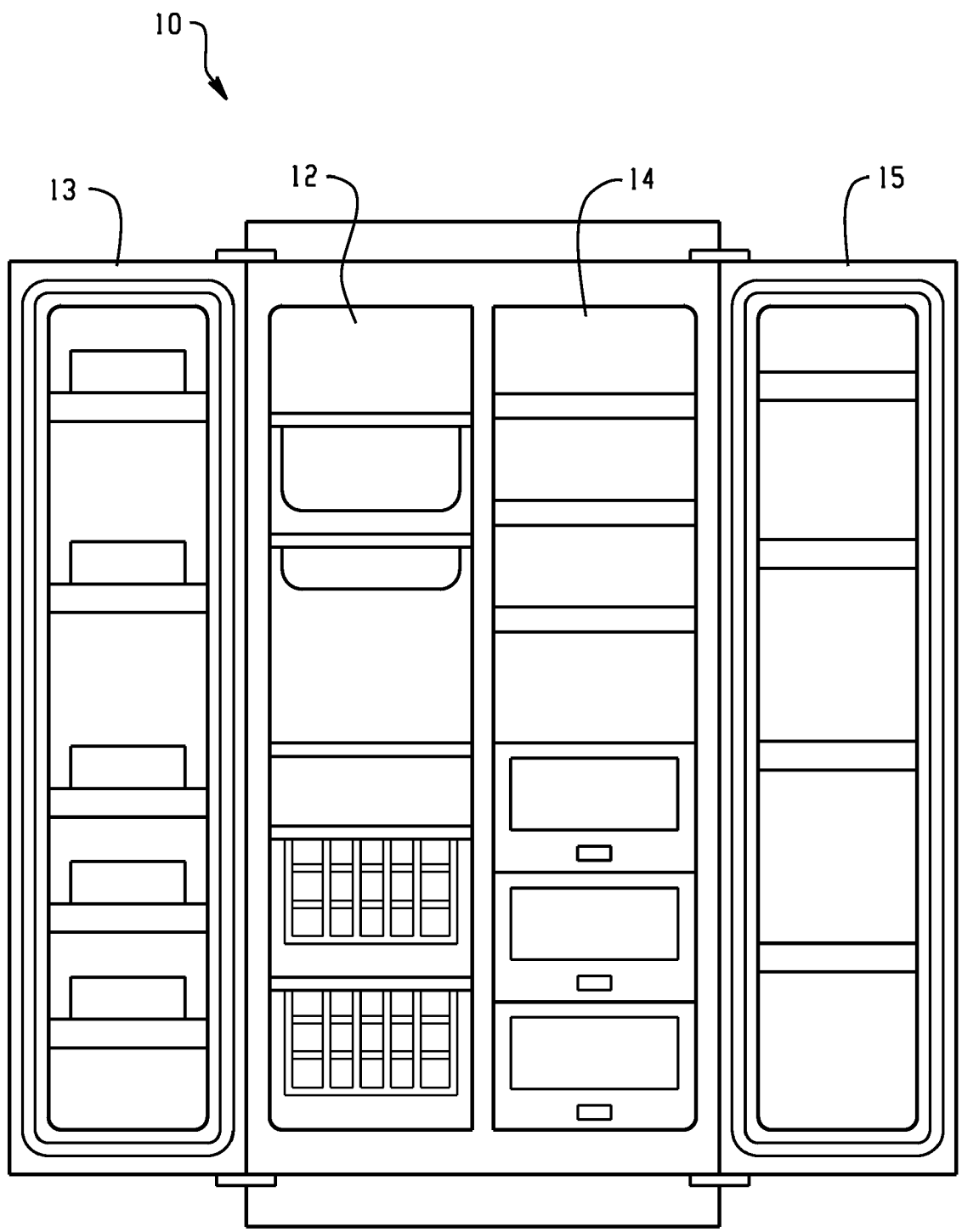
FIG. 1 is front view of a typical refrigerator.
Figure 2:
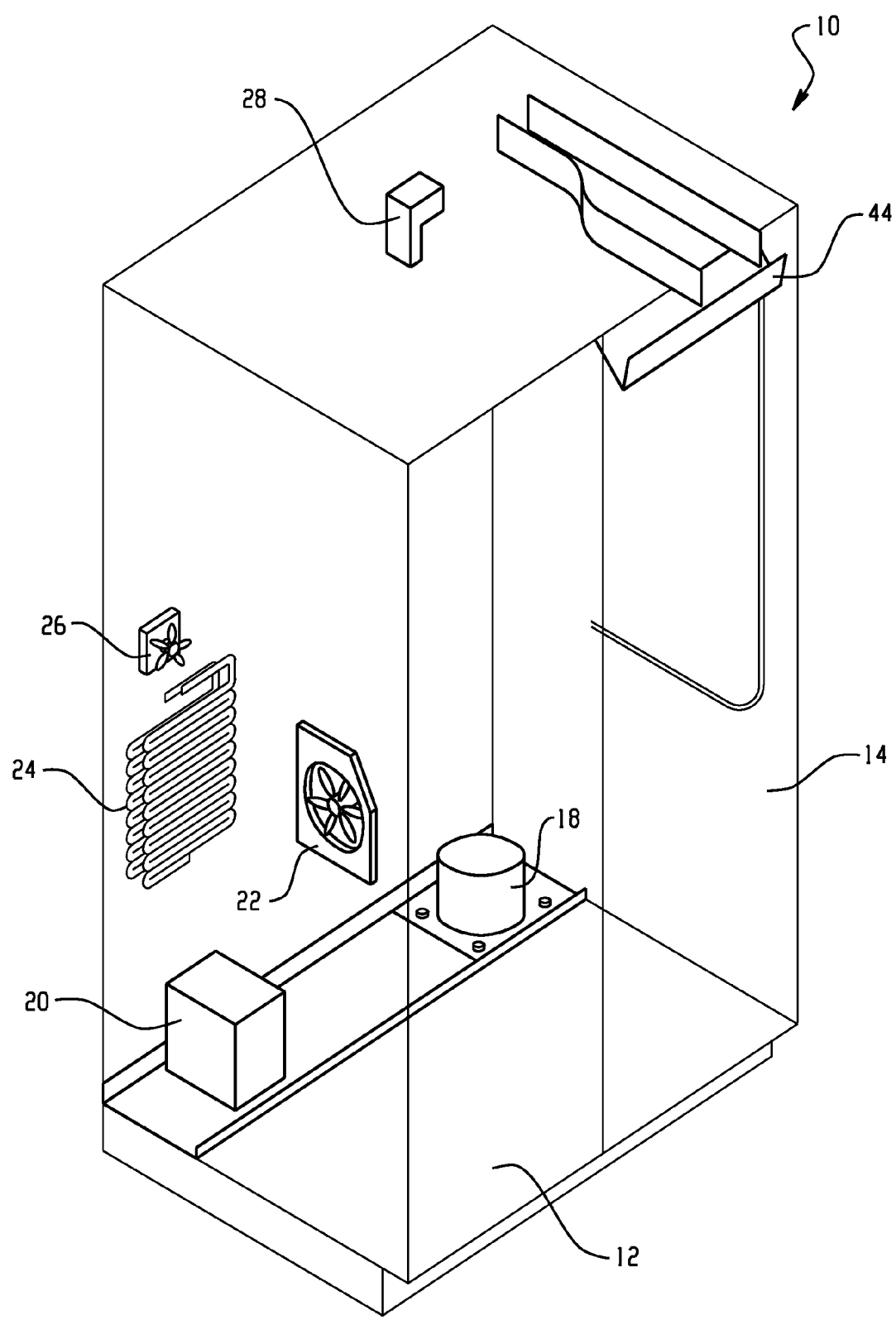
FIG. 2 is a perspective view of the refrigerator showing the location of the refrigerator system.

Referring now to the drawings, FIGS. 1 and 2 show a typical refrigerator 10 with a first compartment 12 and a second compartment 14, where the first compartment 12 is a freezer compartment with a freezer compartment door 13 and the second compartment 14 is a fresh-food compartment 14 with a fresh-food compartment door 15. A channel connects the freezer 12 and fresh-food 14 compartments to allow air flow between the two compartments 12, 14. A damper 28 is provided in the channel to regulate the air flow between the freezer 12 and fresh-food 14 compartments. The refrigerator 10 includes a refrigeration system for cooling the compartments 12, 14 that includes refrigeration components comprising a variable speed compressor 18, a condenser 20, a condenser fan 22, an evaporator 24 and a variable speed evaporator fan 26. The variable speed compressor 18 operates at an optimum speed $\omega_C$ based on multiple variables, such as sensed temperature, temperature set points and temperature limits as will be described in further detail below.

The condenser fan 22 provides circulation through the condenser coil to quickly dissipate heat to thereby improve the performance and efficiency of the variable speed compressor 18. The condenser fan 22 is driven by a motor 23 and can either be connected such that the it will run when the variable speed compressor 18 is running or in the alternative the condenser fan 22 can be independently controlled by the refrigerator control system.

The variable speed evaporator fan 26 operates at multiple speeds and typically has a minimum speed, for example 2000 RPM, and a maximum speed, for example 2700 RPM. The variable speed evaporator fan 26 is driven by a motor 27 that may have a tachometer. Thus, the speed of the variable speed evaporator fan 26 can be regulated by using a closed loop control. Further, the speed of the variable speed evaporator fan 26 can be set as a function of the position of the damper 28. For example, the variable speed evaporator fan 26 may operate at the minimum or the maximum speed when the damper 28 is opened to a position either below or above a predetermined threshold respectively. When the control system 40 senses that the evaporator fan 26 is either not rotating properly or not rotating at all the control system will enter a fail safe mode. In the fail safe mode the damper 28, if open, will close. Then the evaporator fan 26 will be periodically restarted until the evaporator fan 26 restarts at which time the damper 28 will reopen.

As mentioned above, opening and closing of the damper 28 controls the air flow between the freezer 12 and fresh-food compartments 14. Opening and closing of the damper 28 can be controlled by any type of motor 29 known in the art, such as a stepper motor. The position of the damper 28 can be set to any position between the fully closed position and the fully open position. For example, when the fresh-food compartment temperature $T_{FF}$ is above a predetermined fresh-food compartment upper temperature limit $T_{FF-UTL}$ the damper 28 can be set to the full open position to provide the fastest cooling time to the fresh food compartment 14. In contrast, the damper can be set to the full closed position when the fresh-food compartment temperature $T_{FF}$ is below a predetermined fresh-food lower temperature limit $T_{FF-LTL}$ to provide a slower cooling time to the fresh-food compartment 14. Further, if the fresh-food compartment temperature $T_{FF}$ is between the fresh-food compartment upper $T_{FF-UTL}$ and lower $T_{FF-LTL}$ temperature limits the damper 28 can be set to a position between the full open and full closed position to thereby maintain the fresh-food compartment 14 at a constant temperature. Further operation of the damper 28 in conjunction with cooling the fresh food compartment 14 is explained further below.

Figure 3:
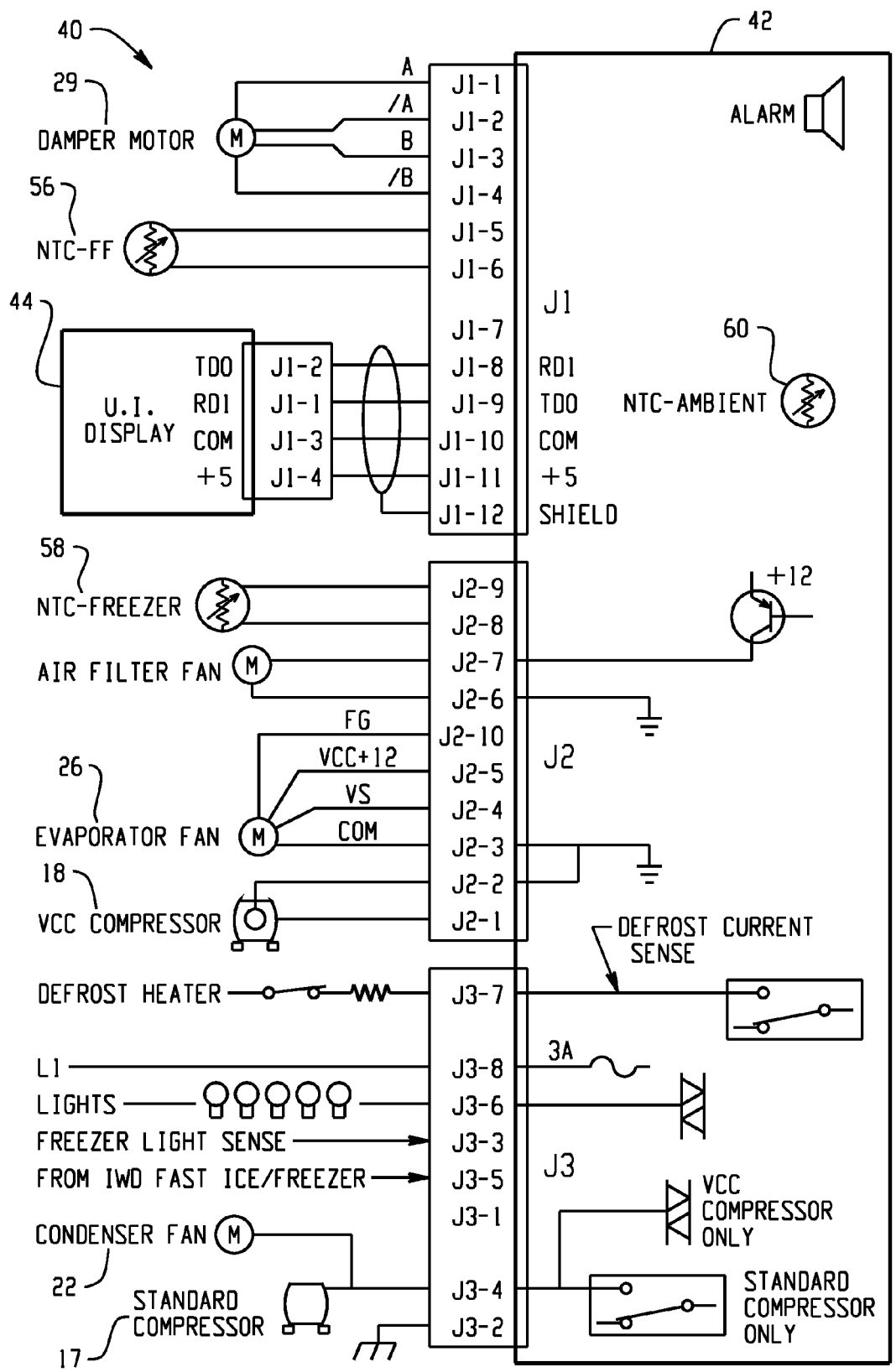
FIG. 3 is a schematic of the electronic control system.

Referring to FIGS. 3-5, the refrigerator 10 further includes an electronic microprocessor-based control system 40 for controlling the refrigeration components, such as the compressor 18, the condenser 20 and condenser fan 22, the evaporator 24 and evaporator fan 26 as well as non-refrigeration components, such as a user interface, indicator lights, alarms, etc. The control system 40 is comprised of a main control board or controller 42 and a user interface/display board 44.

The main control board 42 supplies DC power to the components in the refrigerator 10, such as the user interface control board 44, the variable speed compressor 18, the condenser fan motor 23, the evaporator fan motor 27, the damper motor 29, microprocessors, for implementing control logic or algorithms, and other related circuitry for lights, temperature sensing, alarms, an air filter and air filter fan, etc. as shown in FIG. 3. The control system 40 monitors and may control an ice/water dispenser and a fast ice/fast freeze feature of the refrigerator 10.

Figure 4A:
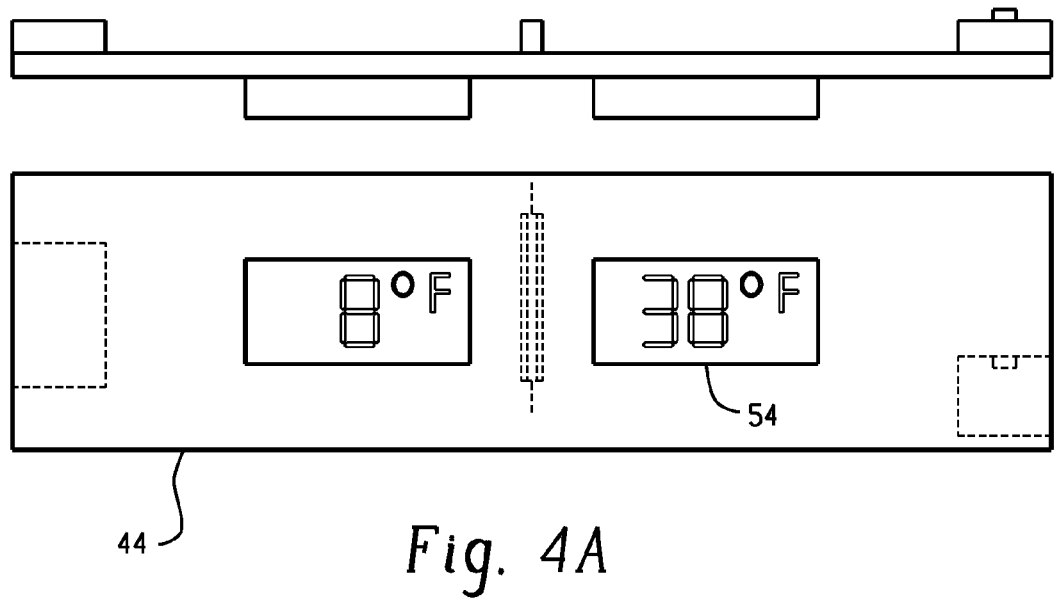
FIGS. 4A and 4B are schematics of the dual user interface display and the single user interface display respectively.
Figure 4B:
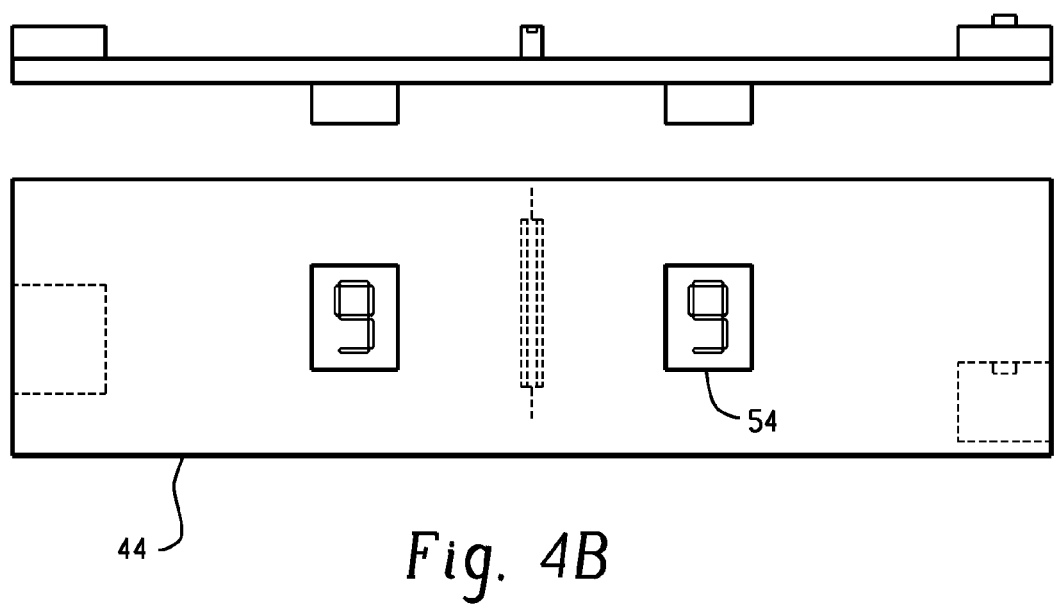
Figure 5A:
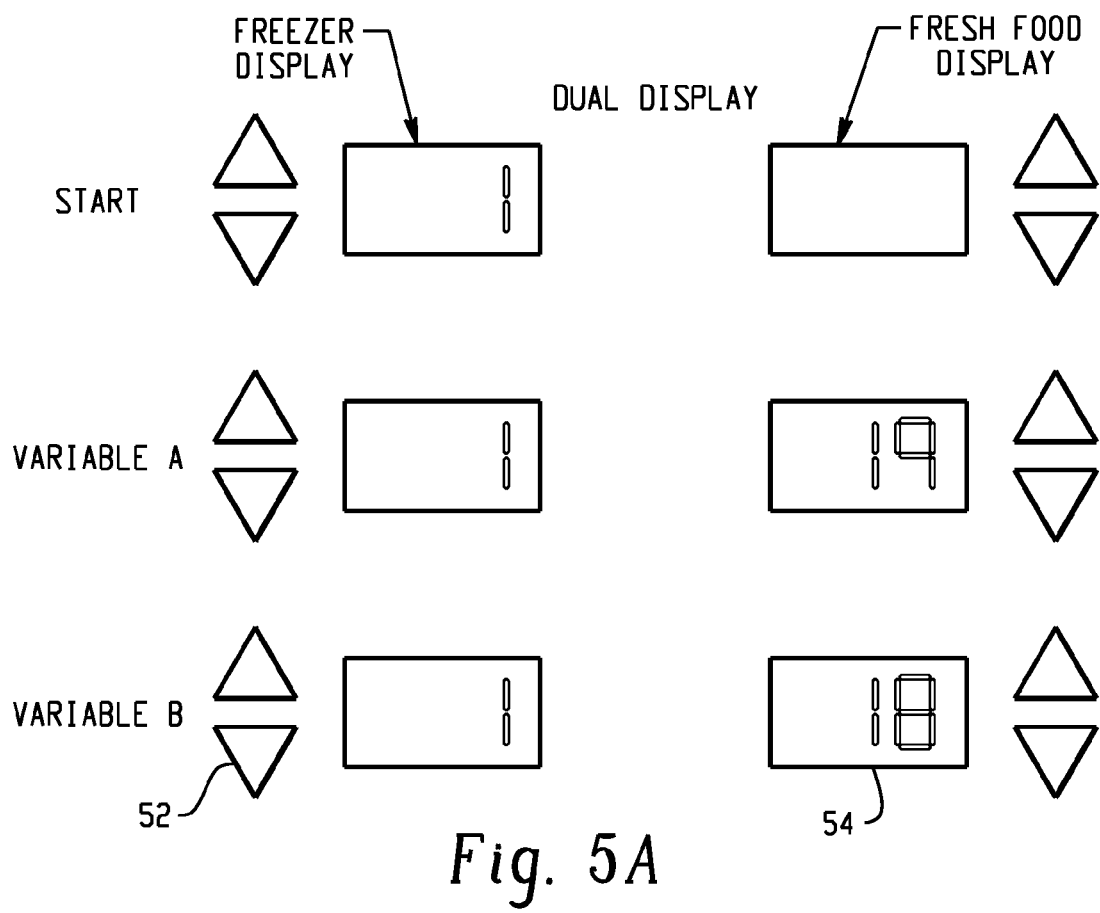
FIGS. 5A and 5B are schematics of the dual user interface display and the single user interface display respectively.
Figure 5B:
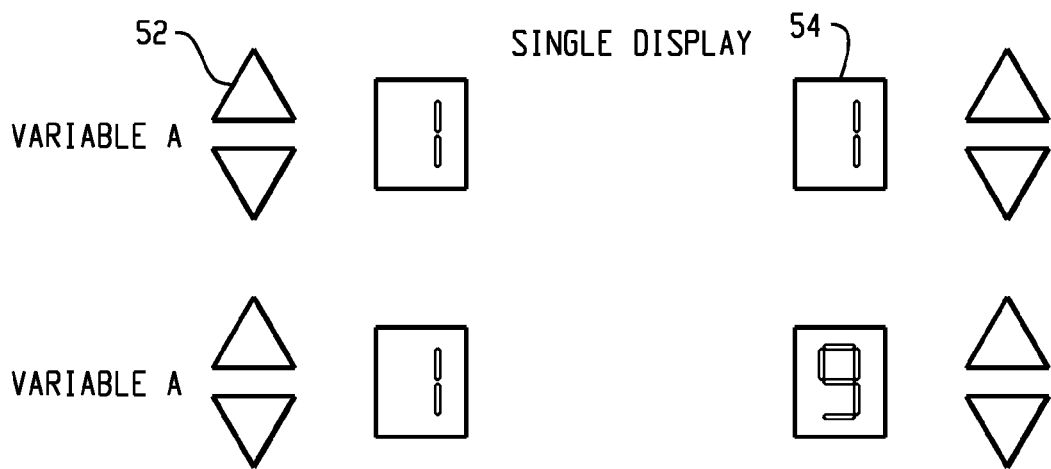

The user interface/display board 44 communicates with the main control board 42 and includes a communication means to allow the user to communicate with the main control board 42. The communication means may be in the form of multiple control switches of any type known in the art, such as membrane switches 52 as shown in FIGS. 5A and 5B. The membrane switches 52 control multiple functions in the refrigerator, such as the freezer and fresh-food temperatures, an alarm an air filter, etc. Referring to FIGS. 4A and 4B, the user interface/display board 44 further includes a display portion 54 for conveying information to the user. The display portion 54 may be any type of display known in the art, such as a 7-segment display. The display portion 54 shown in FIG. 4A is a two-digit, 7-segment display that displays temperature either in degrees Fahrenheit or Centigrade. The display portion shown in FIG. 4B is a single-digit, 7-segment display that displays a temperature setting from 1 to 9. In the event that communication is lost between the main control board 42 and the user interface/display board 44 the control system 40 will enter the fail safe mode. In the fail safe mode the control system 40 will maintain the last freezer and fresh-food compartment set-point temperatures.

The control system 40 further controls multiple alarm functions. These alarm functions include a door ajar alarm, a high temperature alarm and a power failure alarm. The door ajar alarm sounds and a light indicator turns on or flashes when the freezer door 13 or the fresh food door 14 are open for a predetermined period of time, such as for example 5 minutes. The alarm will reset when either the door is closed or an alarm reset key is activated. The high temperature alarm will sound and the light indicator will turn on or flash when either the freezer compartment temperature $T_F$ or the fresh-food compartment temperature $T_{FF}$ are above a predetermined temperature, for example 45° F. for a predetermined period of time, for example 1 hour. The power failure alarm will turn on the light indicator when there is a power interruption for a predetermined period of time. Enabling each alarm is automatic and are started when a power-on reset button is activated. Enabling, however, is delayed until the freezer compartment temperature $T_F$ equals the freezer compartment set-point temperature $T_{F-SP}$ and the fresh-food compartment temperature $T_{FF}$ equals the fresh-food compartment set-point temperature $T_{FF-SP}$. The enable delay may have a maximum time period, such as for example 180 minutes. Once the alarm is enabled an "Alarm On" indicator will turn on indicating that the alarm is active. The alarm can be disabled by activating an alarm disable function, such as for example holding the alarm reset key for 3 seconds.

As mentioned above the variable speed compressor 18 operates at an optimum speed ω based on multiple variables, such as sensed temperature, temperature set points and temperature limits. The speed of the variable speed compressor 18 is calculated, calculated speed $\omega_{calc}$, as a function of the following parameters: 1) a freezer set-point compartment temperature $T_{F-SP}$, 2) a fresh-food compartment set-point temperature $T_{FF-SP}$ and 3) the ambient temperature $T_A$. The calculated speed $\omega_{calc}$ is used to control the speed of the variable speed compressor 18. The calculated speed $\omega_{calc}$ of the variable speed compressor 18 is determined using the following polynomial equation:

$$(T_{F\text{-}SP})*(K1)+(T_{F\text{-}SP})^2*(K2)+(T_{FF\text{-}SP})*(K3)+(T_{FF\text{-}SP})^2*(K4)+(T_A)*(K5)+(T_A)^2*(K6)+(K7) \quad (1)$$

where K1-K7 are predetermined compressor speed variables. If the calculated speed $\omega_{calc}$ of the variable speed compressor 18 is less than a predetermined minimum speed $\omega_{min}$, then variable speed compressor 18 will operate at the minimum speed $\omega_{min}$. Further, if the calculated speed $\omega_{C\text{-}calc}$ of the variable speed compressor 18 is greater than a predetermined maximum speed $\omega_{max}$, then variable speed compressor 18 will operate at the maximum speed $\omega_{max}$. Once operational, adjusting the speed of the variable speed compressor 18 becomes a function of at least one of the following parameters: 1) the freezer compartment set-point temperature $T_{F\text{-}SP}$, 2) a freezer compartment temperature $T_F$, 3) a freezer compartment upper temperature limit $T_{F\text{-}UTL}$ and 4) a freezer compartment lower temperature limit $T_{F\text{-}LTL}$. The adjusted speed $\omega_{adj}$ is determined by the following equation:

$$\omega_{calc}+\{T_F-(T_{F\text{-}UTL}+4+T_{F\text{-}SP})\}*K8 \quad (2)$$

where K8 is a predetermined compressor speed variable.

Figure 6A:
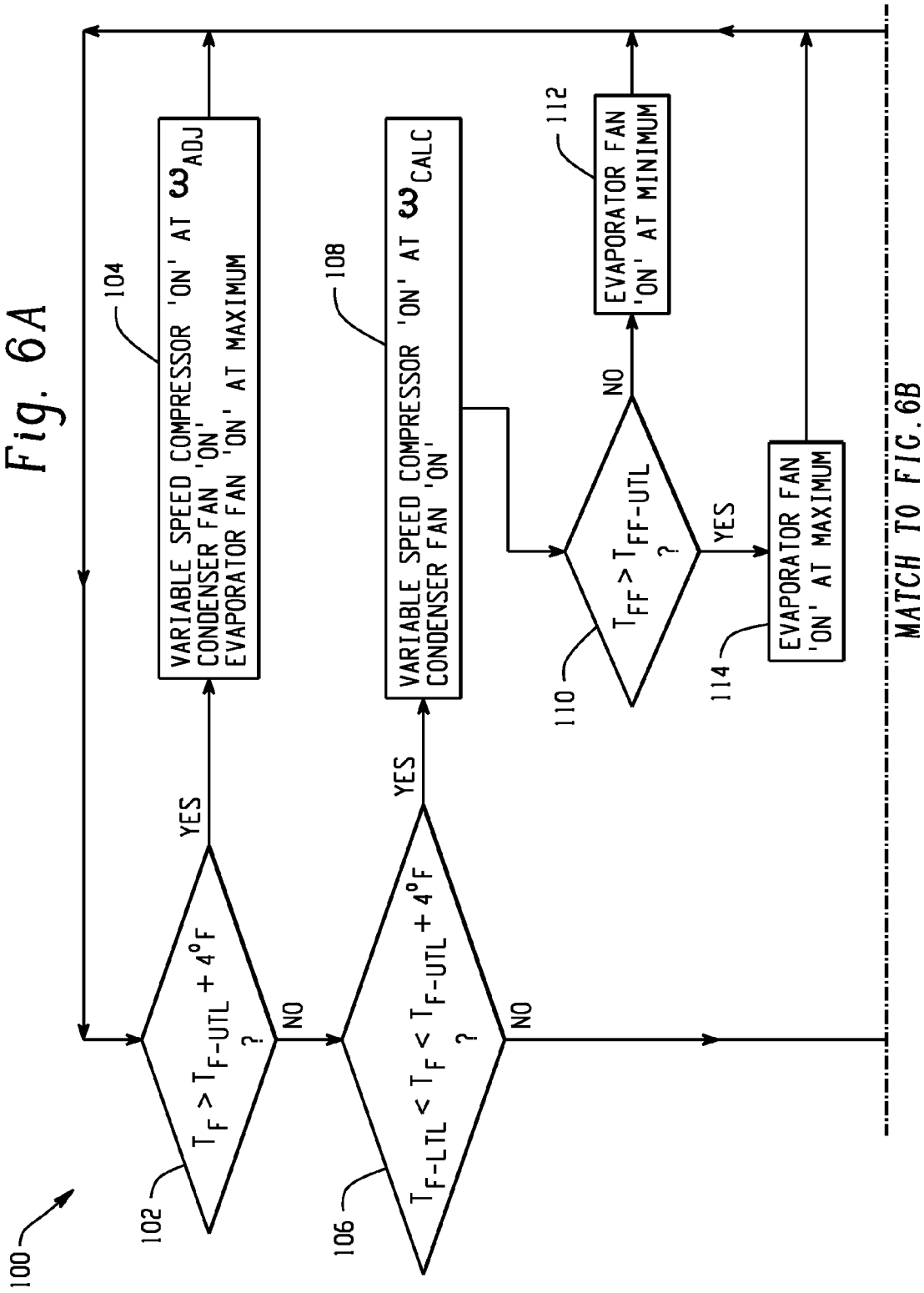
FIGS. 6A and 6B are a flowchart illustrating the operation of the refrigerator system as controlled by the freezer compartment temperature.
Figure 6B:
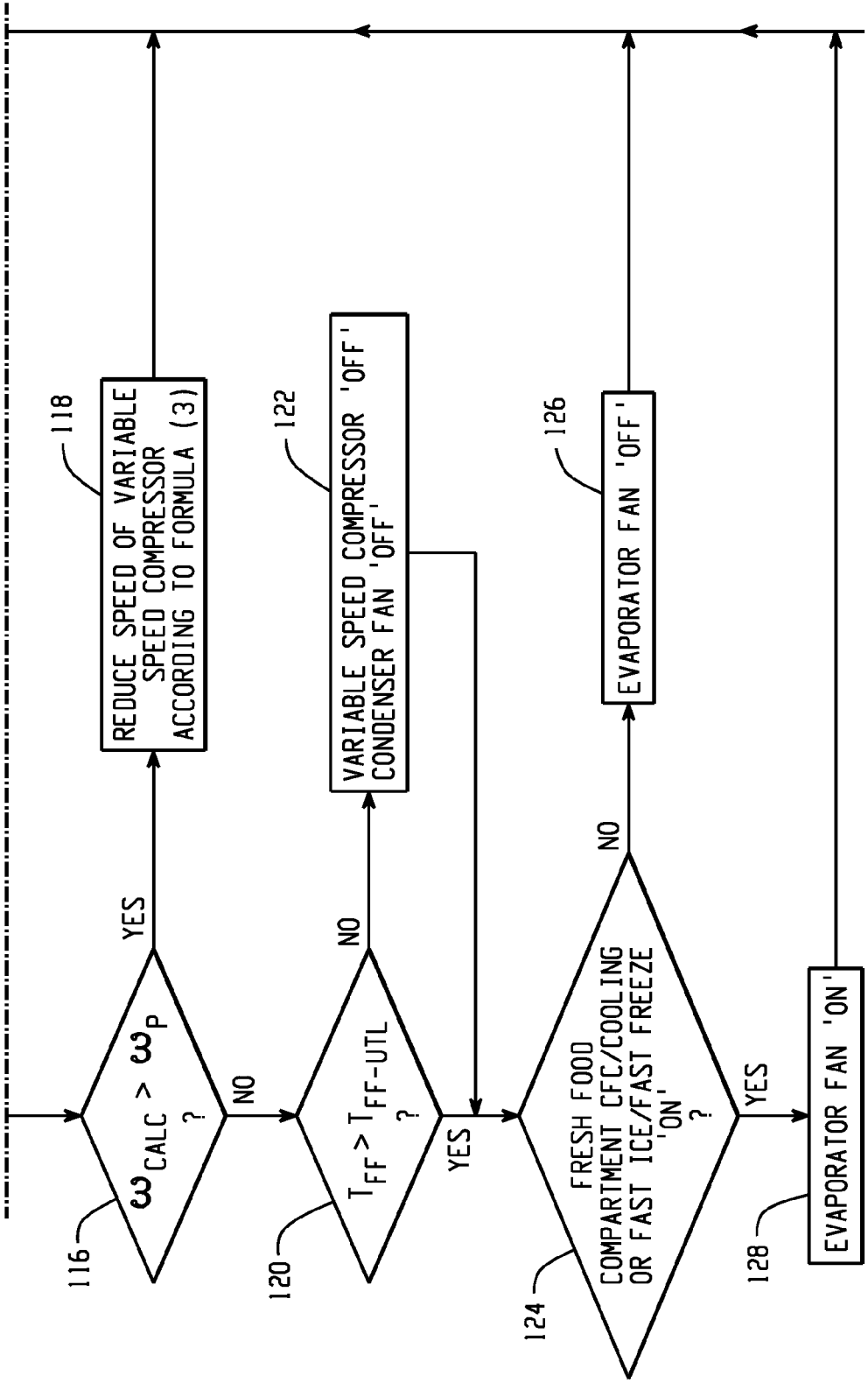

Referring to FIGS. 6A and 6B, an algorithm represented by a flowchart 100 illustrates the operation of the refrigeration system based on the freezer compartment temperature $T_F$. During operation of the refrigerator 10 the freezer compartment temperature $T_F$ is monitored to determine if the freezer compartment temperature $T_F$ is above, below or within the freezer compartment upper $T_{F\text{-}UTL}$ and lower $T_{F\text{-}LTL}$ temperature limits. The process begins at step 102 where the freezer compartment temperature $T_F$ is measured to determine if it is greater than the freezer compartment upper temperature limit $T_{F\text{-}UTL}$ plus 4° F. If YES, then the variable speed compressor 18 will operate at an adjusted speed $\omega_{adj}$ as defined by equation (2) above, as shown in step 104. In addition, the condenser fan 22 will turn ON and the evaporator fan 26 will operate at its maximum speed. If NO, then the process proceeds to step 106 where the freezer compartment temperature $T_F$ is measured to determine if it is greater than the freezer compartment lower temperature limit $T_{F\text{-}LTL}$ and less than the freezer compartment upper temperature limit $T_{F\text{-}UTL}$ plus 4° F. If YES, then at step 108 the variable speed compressor 18 will continue to operate at the calculated speed $\omega_{calc}$ and the condenser fan 22 will turn ON. Further, to determine the speed of the evaporator fan 26 under this condition the fresh-food compartment temperature $T_{FF}$ is measured to determine if it is greater than the fresh-food compartment upper temperature limit $T_{FF\text{-}UTL}$. If YES, then at step 114 the evaporator fan 22 will operate at its maximum speed. If NO, then at step 112 the evaporator fan will operate at its minimum speed. If the freezer compartment temperature $T_F$ is not within the freezer compartment lower $T_{F\text{-}LTL}$ and upper $T_{F\text{-}UTL}$ temperature limits the freezer compartment temperature $T_F$, therefore, must be less than the freezer lower compartment temperature limit $T_{F\text{-}LTL}$ and the process proceeds to step 116. At step 116 the speed of the variable speed compressor 18 is calculated $\omega_{calc}$ to determine if it is greater than a predetermined compressor speed $\omega_p$. If YES, then the speed of the variable speed compressor 18 will be reduced according to the following equation:

$$\omega_{calc}+K11*[T_F-(T_{F\text{-}SP}-5)] \quad (3)$$

where K11 is a compressor speed variable. If NO, the process proceeds to step 120 to determine if the fresh-food compartment temperature $T_{FF}$ is greater than the fresh food compartment upper temperature limit $T_{FF\text{-}UTL}$. If NO, then at step 122 the variable speed compressor 18 and the condenser fan 26 will turn OFF. To determine the speed of the evaporator fan 26 under this condition or if the decision at step 124 is NO the process proceeds to step 124 to determine if there is a call for cooling (CFC) for the fresh food compartment 14 or if the fresh food compartment 14 is cooling or if the fast ice or fast freeze feature is activated. If NO, then at step 126 the evaporator fan 26 will turn OFF. If YES, then at step 128 the evaporator fan 26 will turn ON. The algorithm continuously repeats to maintain the freezer compartment temperature $T_F$ and the fresh-food compartment temperature $T_{FF}$ at proper levels.

Figure 7B:
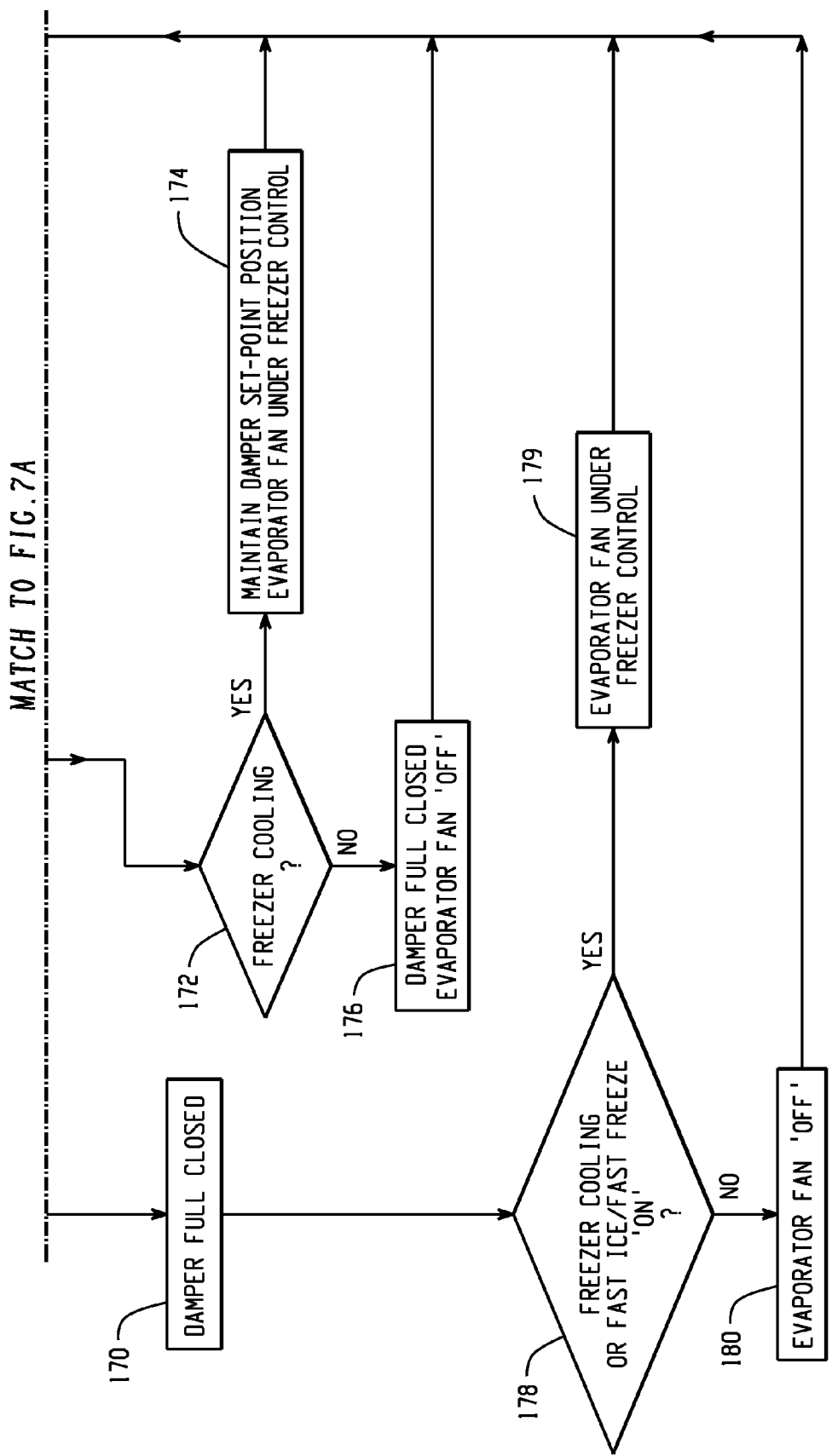

FIGS. 7A and 7B show an additional algorithm represented by a flowchart 150 where the operation of the damper 28 and the evaporator fan 26 are a function of the fresh-food compartment temperature $T_{FF}$. The process begins at step 152 where the fresh-food compartment temperature $T_{FF}$ is measured to determine if it is greater than or equal to the fresh-food compartment upper temperature limit $T_{FF\text{-}UTL}$. If YES, then at step 154 the process determines if the control system 40 has requested a demand that the evaporator fan 26 be activated, known as a DEMAND FAN ON. A DEMAND FAN ON request is made when the door 15 to the fresh-food compartment 14 is opened during the last or the current variable speed compressor 18 cycle or the fresh-food compartment temperature $T_F$ is greater than the fresh-food compartment upper temperature limit $T_{FF\text{-}UTL}$ or the ambient temperature $T_A$ is greater than a predetermined value, such as for example 80° F. If there is a request for a DEMAND FAN ON then at step 156 the damper 28 will be in a full open position and the evaporator fan 26 will turn ON at maximum speed. If there is not a request for a DEMAND FAN ON then at step 158 the process determines if the freezer compartment 12 is cooling. If YES, then the damper 28 will be in a full open position and the evaporator fan 26 will turn ON at maximum speed. IF NO, then at step 162 the damper 28 will be in a full closed position and the evaporator fan 26 will turn OFF. If at step 152 the fresh-food compartment temperature $T_{FF}$ is not greater than or equal to the fresh-food compartment upper temperature limit $T_{FF\text{-}UTL}$ the process proceeds to step 164 where the fresh-food compartment temperature $T_{FF}$ is measured to determine if it is within the fresh-food compartment lower $T_{FF\text{-}LTL}$ and upper $T_{FF\text{-}UTL}$ temperature limits. If YES, then at step 166 the process determines if there is a DEMAND FAN ON request. If YES, then at step 168 the damper 28 will maintain its set-point position and the evaporator fan 26 will turn ON at minimum speed. If there is not a request for a DEMAND FAN ON then at step 172 the process determines if the freezer compartment 12 is cooling. If YES, then at step 174 the damper 28 will maintain its set-point position and control of the evaporator fan 26 will be a function of the freezer compartment temperature $T_F$ as described above. IF NO, then at step 176 the damper 28 will be in a full closed position and the evaporator fan 26 will turn OFF. If the fresh-food compartment temperature $T_{FF}$ is not within the fresh-food compartment lower $T_{FF\text{-}LTL}$ and upper $T_{FF\text{-}UTL}$ temperature limits at step 164 the process proceeds to step 170 where the damper 28 is in a full closed position. Then at step 178 the process determines if the freezer compartment 12 is cooling or if the fast ice/fast freeze feature is ON. If YES, then at step 179 the evaporator fan 26 will be a function of the freezer compartment temperature $T_F$ as described above. If NO, then at step 180 the evaporator fan 25 will turn OFF. The algorithm continuously repeats to maintain the fresh food compartment temperature $T_{FF}$ at a proper level.

Multiple negative temperature coefficient (NTC) thermistors comprising a fresh-food temperature sensor 56, a freezer temperature sensor 58 and an ambient temperature sensor 60 are provided for sensing the fresh-food compartment temperature $T_{FF}$, the freezer compartment temperature $T_F$ and the ambient temperature $T_A$ respectively. The main control board 42 receives electrical signals from the NTC thermistors 56, 58, 60 to process temperature information to thereby control the operation of the refrigeration and non-refrigeration components as described above. In the event that either the fresh-food temperature sensor 56 or the freezer temperature sensor 58 fails (e.g. opens or shorts) then no electrical signal will be sent from the temperature sensor 56, 58 to the main control board 42. In this situation the control system 40 will enter the fail safe mode as will be subsequently described.

If the fresh-food temperature sensor 56 fails the control system 40 will open and close the damper 28 at predetermined intervals to maintain the proper temperature level inside the fresh-food compartment 14. The open and close intervals are a function of the ambient temperature $T_A$ and both the fresh-food $T_{FF-SP}$ and freezer $T_{F-SP}$ compartment set-point temperatures. The interval for the damper open time is calculated by the following equation:

$$K12+K13*T_A-K14*T_{FF-SP}+K15*T_{F-SP} \quad (4)$$

where K12-K15 are predetermined variables. The interval for the damper closed time is calculated by the following equation:

$$K16-K17*T_A+K18*T_{FF-SP}-K19*T_{F-SP} \quad (5)$$

where K16-K19 are predetermined variables.

If the freezer temperature sensor 58 fails the variable speed compressor 18 is cycled on and off using the calculated speed $\omega_{calc}$ at 100% duty cycle.

The control system 40 further includes an adaptive defrost control device as disclosed in U.S. Pat. Nos. 6,694,755 and 6,837,060, both of which are assigned to the Applicant of the present application and both of which are herein incorporated by reference. An override function allows the control system 40 to override the adaptive defrost control device and switch the defrost function to a more conventional timer-based defrost method.

While specific embodiments of the invention have been described and illustrated, it is to be understood that these embodiments are provided by way of example only and that the invention is not to be construed as being limited thereto but only by proper scope of the following claims.

What is claimed is:

1. A method of controlling a refrigeration system in a refrigerator comprising the steps of:
   measuring a freezer compartment temperature and an ambient temperature;
   determining a freezer compartment upper temperature limit, a freezer compartment lower temperature limit, a freezer compartment set-point temperature, and a fresh-food compartment set-point temperature;
   comparing the freezer compartment temperature with the freezer compartment upper temperature limit and the freezer compartment lower temperature limit; and
   operating at least one of a variable speed compressor, a condenser fan, and an evaporator fan based on a comparison of the freezer compartment temperature, the freezer compartment set-point temperature, the fresh-food compartment set-point temperature and the ambient temperature
   wherein a first control logic or algorithm is used for operating the at least one of the variable speed compressor, the condenser fan, and the evaporator fan for when the freezer compartment temperature is greater than the freezer compartment upper temperature limit, a second control logic or algorithm is used when the freezer compartment temperature is greater than a freezer compartment lower temperature limit and less than a freezer compartment upper temperature limit, and a third control or algorithm is used when the freezer compartment temperature is less than the freezer compartment lower temperature limit.

2. The method of claim 1, wherein if the freezer compartment temperature is greater than the freezer compartment upper temperature limit the method further comprising the steps of:
   adjusting the speed of the variable speed compressor based on at least one of a freezer compartment set-point temperature, a freezer compartment temperature, a freezer compartment upper limit temperature and a freezer compartment lower temperature limit;
   turning on the condenser fan; and,
   turning on the evaporator fan at maximum speed.

3. The method of claim 1, wherein if the freezer compartment temperature is greater than a freezer compartment lower temperature limit and less than a freezer compartment upper temperature limit the method further comprising the steps of:
   operating the speed of the variable speed compressor at a calculated speed based on the freezer compartment set-point temperature, the fresh-food compartment set-point temperature and the ambient temperature;
   turning on the condenser fan;
   comparing a fresh-food compartment temperature to a fresh-food compartment upper temperature limit;
   wherein if the fresh-food compartment temperature is greater than the fresh-food compartment upper temperature limit turning on the evaporator fan at maximum speed, and,
   wherein if the fresh-food compartment temperature is less than the fresh-food compartment upper temperature limit turning on the evaporator fan at minimum speed.

4. The method of claim 1, wherein if the freezer compartment temperature is less than freezer compartment lower temperature limit the method further comprising the steps of:
   calculating the speed of the variable speed compressor based on the freezer compartment set-point temperature, the fresh-food compartment set-point temperature and the ambient temperature;
   comparing the calculated speed to a predetermined variable compressor speed; and,
   reducing the speed of the variable speed compressor based on the freezer compartment temperature and the freezer compartment set-point temperature if the calculated speed is greater than the predetermined variable compressor speed.

5. The method of claim 4 further comprising the steps of:
   comparing a fresh-food compartment temperature to a fresh-food compartment upper temperature limit;
   turning the variable speed compressor and condenser fan off if the fresh-food compartment temperature is greater than the fresh-food compartment upper temperature limit;
   determining if the fresh-food compartment is cooling or a fast ice/fast freeze function is on;
   turning the evaporator fan off if the fresh-food compartment is not cooling and the fast ice/fast freeze function is off; and,
   turning the evaporator fan on if the fresh-food compartment is cooling or the fast ice/fast freeze function is on.

* * * * *